United States Patent [19]

Fellers

[11] 3,995,697
[45] Dec. 7, 1976

[54] WEIGHT TRANSFER UNIT
[76] Inventor: Dickie D. Fellers, Rte. 1, Hereford, Tex. 79045
[22] Filed: Aug. 4, 1975
[21] Appl. No.: 601,654
[52] U.S. Cl. .................................. 172/440; 172/1; 172/449; 172/450; 172/677; 280/405 B
[51] Int. Cl.² ................ A01B 59/043; A01B 63/00
[58] Field of Search .......... 172/1.7, 439, 440, 449, 172/450, 452, 677; 280/405, 406, 407

[56] References Cited
UNITED STATES PATENTS

| | | | |
|---|---|---|---|
| 2,673,092 | 3/1954 | Sutherland | 280/406 R |
| 3,347,560 | 10/1967 | Hodges et al. | 172/7 X |
| 3,485,512 | 12/1969 | Folkerts | 280/406 R |
| 3,565,458 | 2/1971 | Bettin | 280/405 B |

*Primary Examiner*—Paul E. Shapiro
*Attorney, Agent, or Firm*—Wendell Coffee

[57] ABSTRACT

A tillage implement behind a farm tractor is picked up at the center of gravity, therefore, transferring weight to the rear wheels of the tractor while not changing the setting or balance of the tillage implement.

6 Claims, 3 Drawing Figures

WEIGHT TRANSFER UNIT

BACKGROUND OF THE INVENTION

1. Field of the Invention

This invention relates to tilling the soil and more particularly to pulling tillage implements behind farm tractors.

2. Description of the Prior Art

The present day farm tractors commercially in use commonly have two rear traction wheels and two front steerable wheels. When pulling heavy loads it is desirable to have as much weight as possible upon the traction wheels. Also, the standard farm tractor has a three-point power and draft linkage having two lift links and a stabilizing link. The lift links are connected to the power system of the tractor so they may be raised and lowered, thereby raising and lowering any equipment attached thereto. On modern tractors, the raising and lowering is by the hydraulic pressure system of the tractor and a valve is provided within easy reach of the operator so he can readily raise and lower the three-point power linkage.

Previous workers in the field suggested that when tractors are towing tailers, booms should be attached to three-point linkage and a tension member extended to the tongue of the trailer. The purpose of this was to transfer weight to the rear traction wheels.

SUTHERLAND, U.S. Pat. No. 2,673,092, showed such a mechanism with springs extending from the boom to the trailer tongue.

HODGES ET AL, U.S. Pat. No. 3,347,560, shows a swinging boom which is mounted on an angled axis so that as the tractor turns, the boom lowers, thereby reducing the transfer of weight on tires.

SUMMARY OF THE INVENTION

1. New and Different Function

I have discovered that with a tillage implement any system attempting to attach the tension member to the tongue of the tillage implement is unsuccessful. The fore and aft adjustment or the levelling of the implement from front to back is important; therefore, if any tension element is attached from the boom to the forward part of the tillage implement at the tongue, this disrupts the fore and aft adjustment and when more lifting strain is placed at the front of the implement for greater traction, this changes. Therefore, if the tillage implement is sought to be adjusted for this change, I find the operator at times will change the lifting strain by changing the three-point power linkage. However, I have found that the system will work satisfactorily if the attachment is made to the center of gravity of the tillage implement, thereby, not changing the fore and aft adjustment of the tillage implement; I have found the only successful attachment is that of a spring to absorb the changes in load according to operating conditions.

2. Objects of the Invention

An object of this invention is to till the soil.

Further objects are to provide an attachment of a tractor to a tillage implement and transfer weight from the tillage implement to the tractor while tilling the soil with the tillage implement.

Still further objects are to achieve the above with a device that is sturdy, compact, durable, lightweight, simple, safe, efficient, versatile, and reliable, yet inexpensive and easy to manufacture, install, adjust, operate and maintain.

Other objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
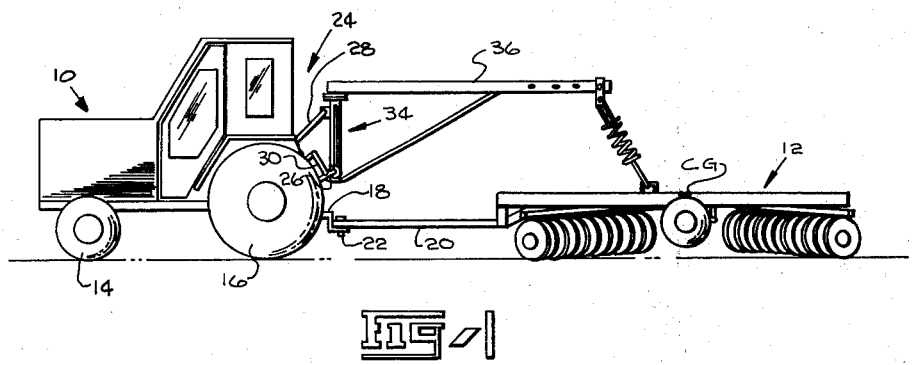
FIG. 1 is a side elevational view of a tractor and tillage implement with an embodiment of my invention connected therebetween.
Figure 2:
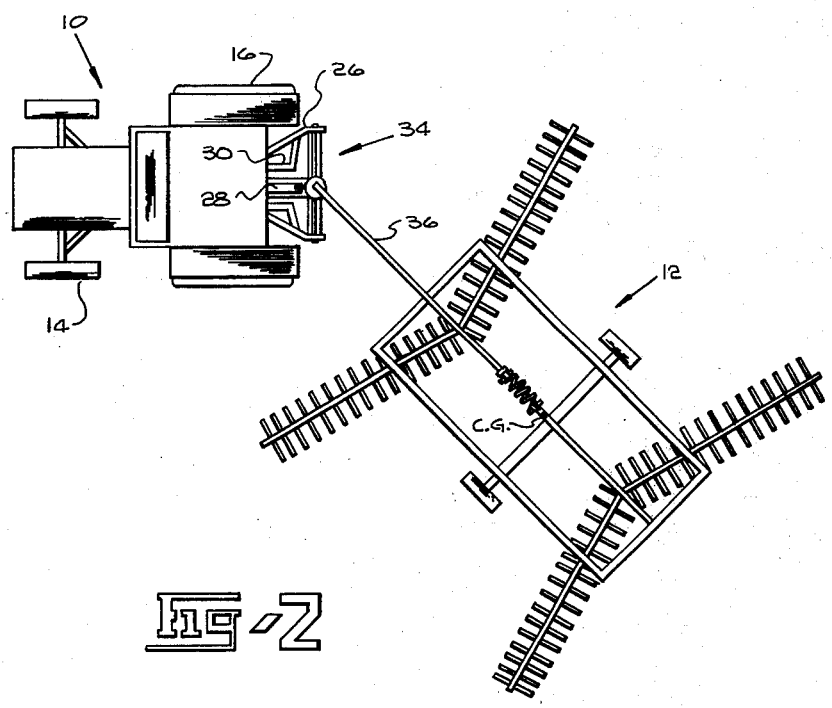
FIG. 2 is a top plan view of the equipment shown in FIG. 1 showing the position of the elements as the tractor is turning with the implement behind it.

Referring to the drawing and more particularly to FIGS. 1 and 2, there may be seen tractor 10 pulling tillage implement 12. A typical plowing implement would be tandaum disc harrow. However, it will be understood that any number of tillage implements or plows 12 could be pulled behind the tractor 10. The tilling implement 12 has a center of gravity indicated by the letters "CG." The tractor 10 has front steerable wheels 14 and rear traction wheels 16. The tractor 10 also has draw bar 18 which is connected to tongue 20 of the tillage implement by draw pin 22. The tractor also has three-point power and draft linkage 24. The three-point linkage includes two lift links 26 and stabilizing link 28. The lift links 26 have power means 30 interconnecting the tractor and the lift links for raising and lowering the lift links. As previously described, this is hydraulic actuated and controled from a valve within the tractor. As will be understood, the equipment described to this point is all standard equipment and the connection described to this point is standard agricultural practice.

Figure 3:
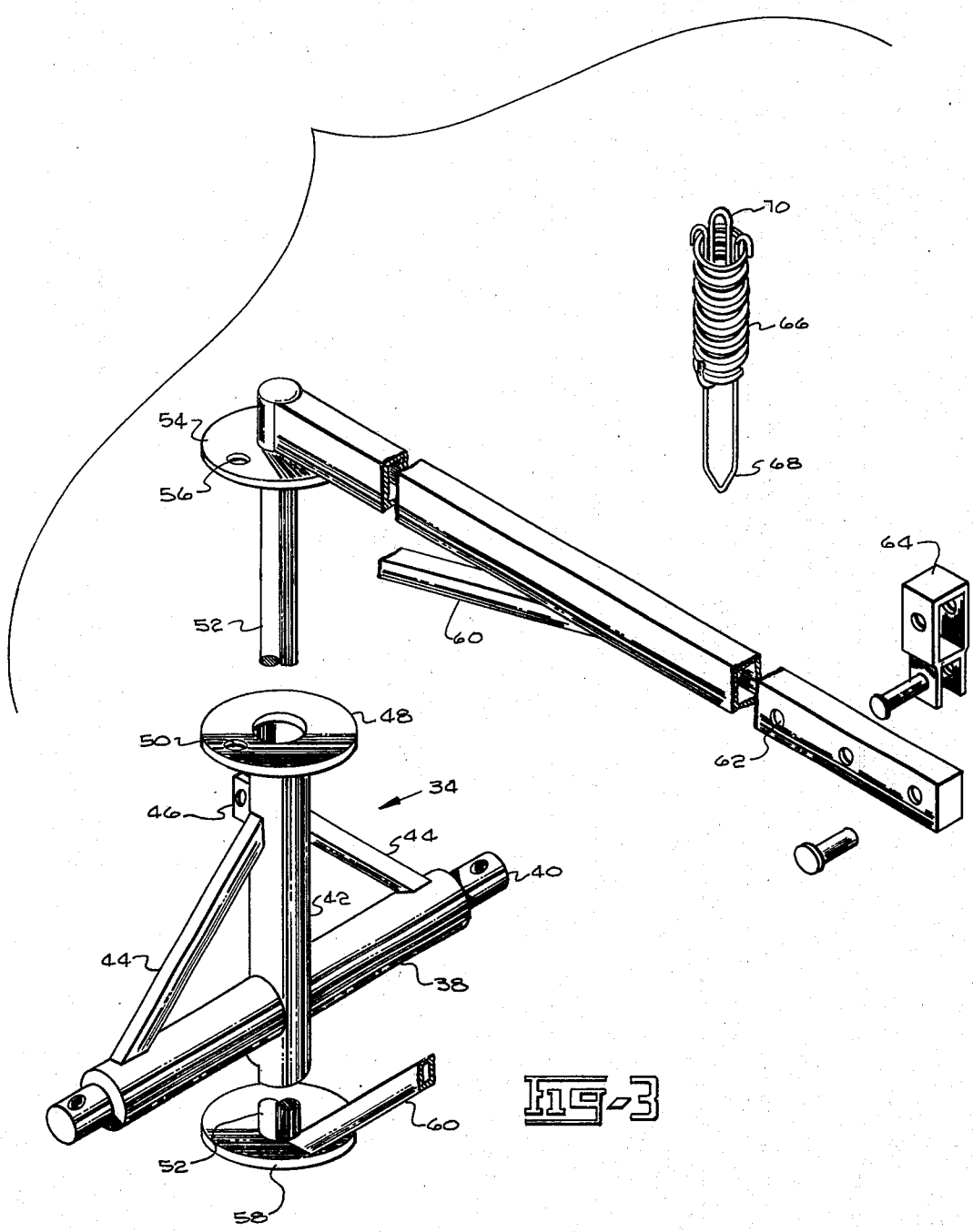
FIG. 3 is an exploded view of the tube frame, mast, boom and spring.

To the standard equipment described above, I attach tube frame 34. The tube frame and associated boom 36 are more clearly seen in FIG. 3. The tube frame 34 includes horizontal crossbeam 38. Each end of the horizontal crossbeam has bolts or horns 40 by which the horizontal crossbeam is connected at each end to the lift links 26. Holes in the ends of the horns 40 provide for pins to hold the lift links to the crossbeam 38. Tube 42 is attached as by welding to the crossbeam 38. In operation the tube extends vertically upward and the axis of the tube 42 is aligned with the draw pin 22. Bracing members 44 extend from the horizontal crossbeam 38 to the tube 42 to hold it rigidly in position.

Ear 46 has an aperture therethrough to receive a pin by which the tube frame 34 is attached to the sabilizing link 28. The ear 46 is near the top of the tube 42. The top of the tube 42 is capped by flange 48. The flange 48 has hole 50 therethrough, the purpose of which will be described latter.

Boom 36 is welded to the top of mast 52, the mast 52 being telescoped or journaled within the tube 42. There are provisions to lubricate the mast 52 as it swivels or rotates within the tube 42, these being in the form of grease fittings which are not shown in the drawing for the purpose of clarity. Upper mast flange 54 has hole 56 therein. As assembled, the upper mast flange will ride upon the cap flange 48 and provide a bearing surface therebetween. The boom 36 attached to the extreme top of the mast 52 may be locked in place by slipping a pin (not shown) through holes 50 and 56 when they are in alignment. Thus it may be seen that the hole 50 in the flange 48 and hole 56 in the flange 54 with the pin (not shown) form a locking means on the tube and mast for locking the boom to the tube so the boom is directly behind the tractor.

Lower mast flange 58 may be conveniently attached as by welding to the mast after it is assembled within the tube 42. Strut 60 extends from lower mast flange 58 to boom 36 and thereby supporting the boom.

A plurality of holes 62 extend through the boom 36 near the end thereof, which holes provide easy attachment for fitting 64 by which spring 66 may be attached to any one of the holes 62. The lower end of the spring is attached by any convenient mechanism such as a shackle to the tillage implement near the center of gravity CG thereof. Although the spring unit 66 as a whole acts as a yielding tension member, the spring itself is a compression spring having M-loop 68 and W-loop 70 attached therein so that when the spring unit as a whole is fully extended, the spring is not extended beyond its elastic limit.

Therefore, it may be seen that I have achieved the stated objects of having the boom pickup exert an upward stress upon the tillage implement near the center of gravity so it does not disturb the fore and aft adjustment of the tillage implement 12. It will be readily understood that when the tillage implement exerts a downward stress upon the end of the boom, this tends to tilt the tractor backward, reducing the weight upon the front steering wheels 14 and increases weight on the rear traction wheels 16 and thereby achieving the desired transfer of weight.

As an aid to correlating the terms of the claims to the exemplary drawing, the following catalog of elements is provided:

| 10 | tractor | 42 | tube |
|----|---------|----|------|
| 12 | tillage implement | 44 | bracing members |
| 14 | front wheels | 46 | ear |
| 16 | rear wheels | 48 | flange |
| 18 | draw bar | 50 | hole |
| 20 | tongue | 52 | mast |
| 22 | draw pin | 54 | upper mast flange |
| 24 | three-point linkage | 56 | hole |
| 26 | lift links | 58 | lower mast flange |
| 28 | stabilizing link | 60 | strut |
| 30 | power means | 62 | holes |
| 34 | tube frame | 64 | fitting |
| 36 | boom | 66 | spring |
| 38 | horizontal crossbeam | 68 | M-loop |
| 40 | horn | 70 | W-loop |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. In a tractor with a tillage implement,
   a. the tractor having
   b. rear traction wheels,
   c. front steerable wheels,
   d. a draw bar, and
   e. a three-point power and draft linkage including
      i. two lift links,
      ii. power means interconnecting the tractor and links for raising and lowering the lift links, and
      iii. a stabilizing link for stabilizing a mechanism attached to the three-point linkage, and
   f. the tillage implement having
   g. a center of gravity, and
   h. a tongue pinned to said draw bar by
   j. a draw pin;
   k. THE IMPROVED STRUCTURE IN COMBINATION WITH THE ABOVE COMPRISING:
   m. a tube frame having
      i. a horizontal crossbeam
      ii. connected to each end of said lift links,
      iii. an upright tube having an axis attached to the horizontal crossbeam,
      iv. the top of the tube attached to said stabilizing link, and
      v. bracing members from the cross link to the tube,
   n. a mast pivoted within the tube,
   o. a boom attached to the top of the mast,
   p. a strut from the bottom of the mast to the boom for supporting the boom, and
   q. a spring attached from near the end of the boom to the tillage implement at the center of gravity of the tillage implement.

2. The invention as defined in claim 1 with an additional limitation of
   r. the axis of the tube being vertical and aligned with the draw pin.

3. The invention as defined in claim 1 with an additional limitation of
   r. a plurality of holes in the boom and said spring attached through one of the holes.

4. the invention as defined in claim 1 with an additional limitation of
   r. lock means on the top of the tube and mast for locking the boom to the tube so that the boom is directly behind the tractor.

5. The invention as defined in claim 4 with an additional limitation of
   s. a plurality of holes in the boom and said spring attached through one of the holes.

6. The invention as defined in claim 5 with an additional limitation of
   t. the axis of the tube being vertical and aligned with the draw pin.

* * * * *